US011701925B2

(12) United States Patent
Jones et al.

(10) Patent No.: US 11,701,925 B2
(45) Date of Patent: Jul. 18, 2023

(54) STABILIZER STRUCTURE FOR A TREAD OF A TIRE

(71) Applicant: The Goodyear Tire & Rubber Company, Akron, OH (US)

(72) Inventors: Ashley Amanda Jones, Akron, OH (US); John Stephen Guilford, Seville, OH (US); Derek John Becker, Monroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 398 days.

(21) Appl. No.: 15/828,541

(22) Filed: Dec. 1, 2017

(65) Prior Publication Data
US 2019/0168546 A1 Jun. 6, 2019

(51) Int. Cl.
| | |
|---|---|
| *B60C 11/00* | (2006.01) |
| *B60C 11/12* | (2006.01) |
| *B60C 11/04* | (2006.01) |
| *B60C 11/03* | (2006.01) |

(52) U.S. Cl.
CPC ...... *B60C 11/1218* (2013.01); *B60C 11/0323* (2013.01); *B60C 11/042* (2013.01); *B60C 11/125* (2013.01); *B60C 2011/1213* (2013.01); *B60C 2200/06* (2013.01)

(58) Field of Classification Search
CPC ......... B60C 11/04; B60C 11/03; B60C 11/13; B60C 11/0304; B60C 2011/0381; B60C 2011/1213
See application file for complete search history.

(56) References Cited

U.S. PATENT DOCUMENTS

| | | | | |
|---|---|---|---|---|
| 4,854,358 | A * | 8/1989 | Takeuchi | B60C 11/11 152/902 |
| 5,909,756 | A | 6/1999 | Miyazaki | |
| 6,109,316 | A * | 8/2000 | Janajreh | B60C 11/01 152/209.16 |
| 6,488,064 | B1 * | 12/2002 | Radulescu | B60C 11/12 152/209.27 |
| D483,320 | S * | 12/2003 | Janajreh | D12/584 |
| 7,793,692 | B2 | 9/2010 | Nguyen | |
| 7,909,075 | B2 * | 3/2011 | Nakamura | B60C 11/01 152/209.27 |
| 8,074,690 | B2 | 12/2011 | Sevart | |

(Continued)

FOREIGN PATENT DOCUMENTS

| | | |
|---|---|---|
| JP | 2001187517 | 7/2001 |
| JP | 2002029221 | 1/2002 |

OTHER PUBLICATIONS

European Search Report for Serial No. 18207946.7 dated Mar. 26, 2019.

*Primary Examiner* — Alison L Hindenlang
*Assistant Examiner* — Debjani Roy
(74) *Attorney, Agent, or Firm* — June E. Rickey; Robert N. Lipcsik

(57) ABSTRACT

A tread for a tire includes a first circumferential main groove, a second circumferential main groove, a third circumferential main groove, and a fourth circumferential main groove. The fourth main groove has a stabilizing structure for increasing tread stiffness. The stabilizing structure has a circumferentially extending wavy subgroove in a radially innermost bottom of the fourth circumferential main groove.

9 Claims, 5 Drawing Sheets

(56) References Cited

U.S. PATENT DOCUMENTS

| | | | |
|---|---|---|---|
| D690,258 S * | 9/2013 | Oraison | D12/583 |
| 8,720,508 B2 | 5/2014 | Mayni | |
| 9,352,618 B2 | 5/2016 | Suzuki | |
| 9,751,365 B2 | 9/2017 | Mathonet | |
| 2009/0301622 A1 | 12/2009 | Brown | |
| 2010/0038002 A1 | 2/2010 | Wen | |
| 2011/0308676 A1* | 12/2011 | Morozumi | B60C 11/032 152/153 |
| 2016/0272012 A1 | 9/2016 | Morgan | |
| 2016/0318347 A1 | 11/2016 | Bardin | |
| 2016/0318348 A1 | 11/2016 | Cambon | |
| 2017/0021675 A1 | 1/2017 | Kose | |
| 2017/0166015 A1 | 6/2017 | Christenbury | |
| 2017/0174008 A1 | 6/2017 | Marlier | |
| 2018/0345733 A1* | 12/2018 | Ooba | B60C 11/03 |

* cited by examiner

STABILIZER STRUCTURE FOR A TREAD OF A TIRE

FIELD OF INVENTION

The present invention relates to a pneumatic tire, and more specifically, to a tread for a pneumatic tire.

BACKGROUND OF THE INVENTION

A construction may be adopted in conventional pneumatic tires in which, when a cross-section is viewed from a tire meridian direction, a contact patch of a shoulder rib arches and forms a convex on an inner side of a tire radial direction. Due to this construction, contact pressure of the tire may be distributed evenly over a center region and a shoulder region of a tread portion and uneven wear of the tire may be suppressed.

SUMMARY OF THE INVENTION

A tread for a tire, in accordance with the present invention, includes a first circumferential main groove, a second circumferential main groove, a third circumferential main groove, and a fourth circumferential main groove. The fourth main groove has a stabilizing structure for increasing tread stiffness. The stabilizing structure has a circumferentially extending wavy subgroove in a radially innermost bottom of the fourth circumferential main groove.

According to another aspect of the tread, the subgroove has a curved, cylindrical radially innermost surface for mitigating cracking and increasing axial flexibility of the stabilizing structures.

According to still another aspect of the tread, an axial width of the subgroove shrinks to 0.0 mm under a predetermined operating condition.

According to yet another aspect of the tread, the subgroove has a first sidewall and a second sidewall interconnected by the curved, cylindrical radially innermost surface of the subgroove.

According to still another aspect of the tread, the first sidewall abuts the second sidewall under the predetermined operating condition.

According to yet another aspect of the tread, relative motion between the first sidewall and the second sidewall is prevented by a wavy configuration of the first sidewall and a corresponding wavy configuration of the second sidewall.

A method in accordance with the present invention stiffens a tire tread. The method comprises the steps of: extending a first circumferential main groove across the tire tread; extending a second circumferential main groove across the tire tread; circumferentially extending a wavy subgroove across a radially innermost cylindrical bottom surface of the first main groove; and curving a radially innermost surface of the subgroove. The radially innermost surface of the subgroove being radially inside the radially innermost cylindrical bottom surface of the first main groove. sidewall under the predetermined operating condition.

According to another aspect of the method, curved radially innermost surface of the subgroove mitigates cracking and increases axial flexibility of the first main groove.

According to still another aspect of the method, an axial width of the subgroove shrinks to 0.0 mm under a predetermined operating condition.

According to yet another aspect of the method, the subgroove has a first sidewall and a second sidewall interconnected by the curved radially innermost surface of the subgroove.

According to still another aspect of the method, a further step includes abutting the first sidewall against the second sidewall under the predetermined operating condition.

According to yet another aspect of the method, relative motion between the first sidewall and the second sidewall is prevented by a wavy configuration of the first sidewall and a corresponding wavy configuration of the second sidewall.

A system in accordance with the present invention increases cornering stiffness of a tire tread. The system includes a first circumferential main groove, a second circumferential main groove, and a stabilizing structure for increasing tread stiffness. The stabilizing structure has a circumferentially extending wavy subgroove in a radially innermost bottom of the first main groove.

According to another aspect of the system, the subgroove has a curved, cylindrical radially innermost surface for mitigating cracking and increasing axial flexibility of the stabilizing structures.

According to still another aspect of the system, an axial width of the subgroove shrinks to 0.0 mm under a predetermined operating condition.

According to yet another aspect of the system, the subgroove has a first sidewall and a second sidewall interconnected by the curved, cylindrical radially innermost surface of the subgroove.

According to still another aspect of the system, the first sidewall abuts the second sidewall under the predetermined operating condition.

According to yet another aspect of the system, relative motion between the first sidewall and the second sidewall is prevented by a wavy configuration of the first sidewall and a corresponding wavy configuration of the second sidewall.

Definitions

"Apex" means an elastomeric filler located radially above the bead core and between the plies and the turnup ply.

"Annular" means formed like a ring.

"Aspect ratio" means the ratio of a tire section height to its section width.

"Aspect ratio of a bead cross-section" means the ratio of a bead section height to its section width.

"Asymmetric tread" means a tread that has a tread pattern not symmetrical about the centerplane or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Net contact area" means the total area of ground contacting elements between defined boundary edges divided by the gross area between the boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gmAex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: (1) a number of fibers twisted together; (2) a number of fila-ments laid together without twist; (3) a number of filaments laid together with a degree of twist; (4) a single filament with or without twist (monofilament); and (5) a narrow strip of material with or without twist.

BRIEF DESCRIPTION OF THE DRAWINGS

The present invention will be better understood through reference to the following description and the appended drawings, in which.

DETAILED DESCRIPTION OF EXAMPLES OF THE INVENTION

Figure 1:
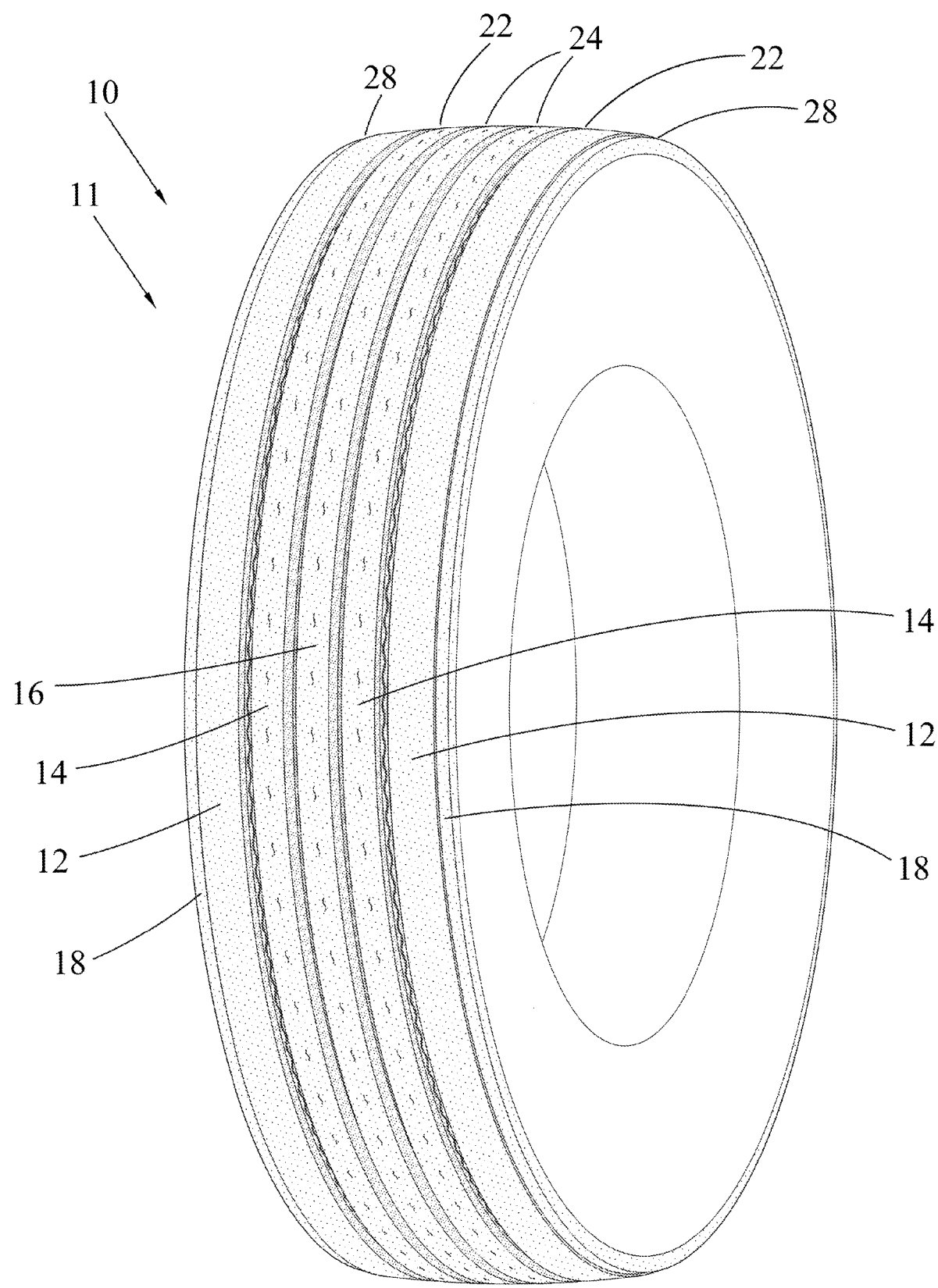
FIG. 1 is a schematic perspective view of a tire in accordance with the present invention.
Figure 2:
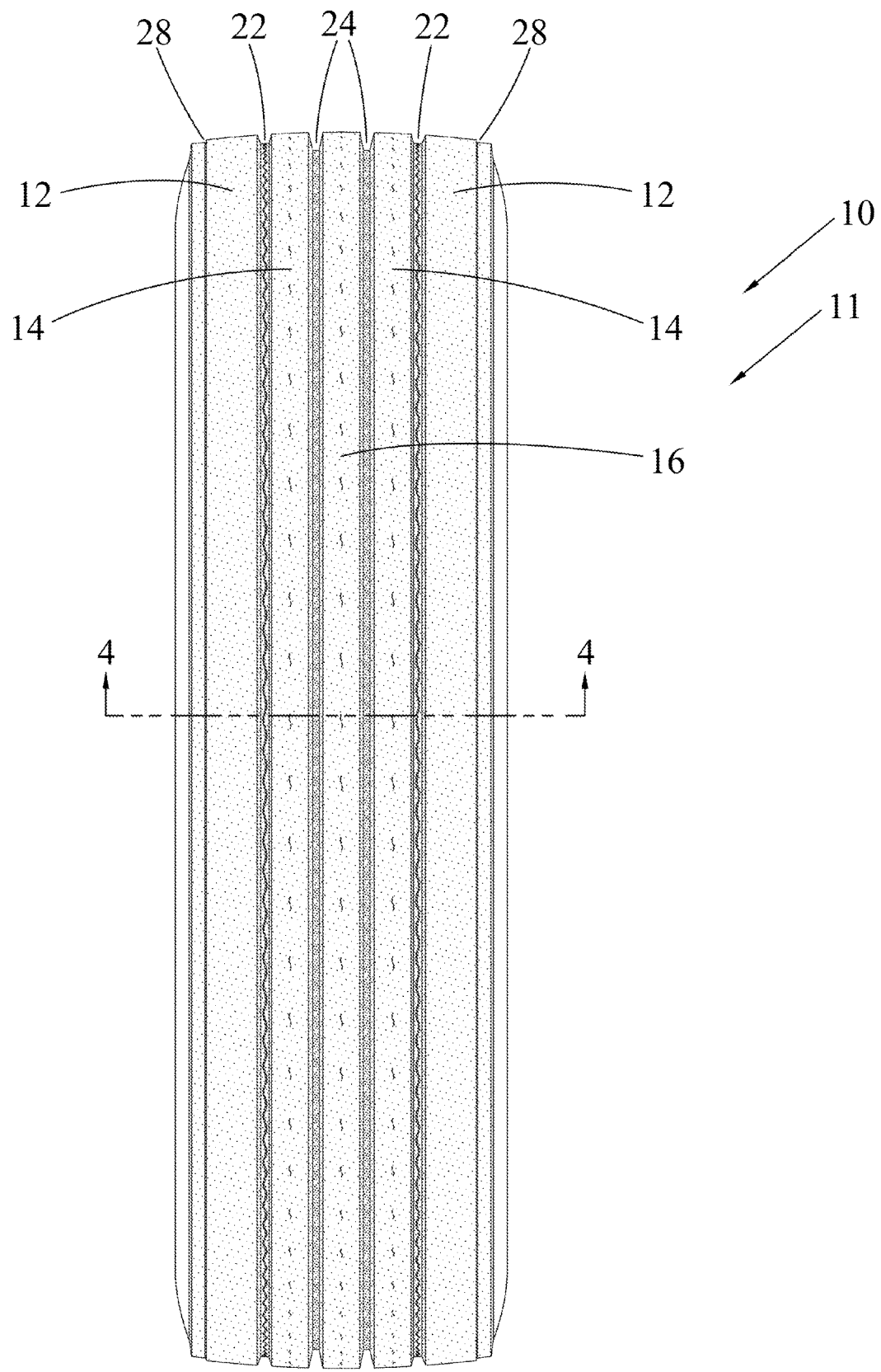
FIG. 2 is a schematic orthogonal view of the tread of the tire of FIG. 1.
Figure 3:
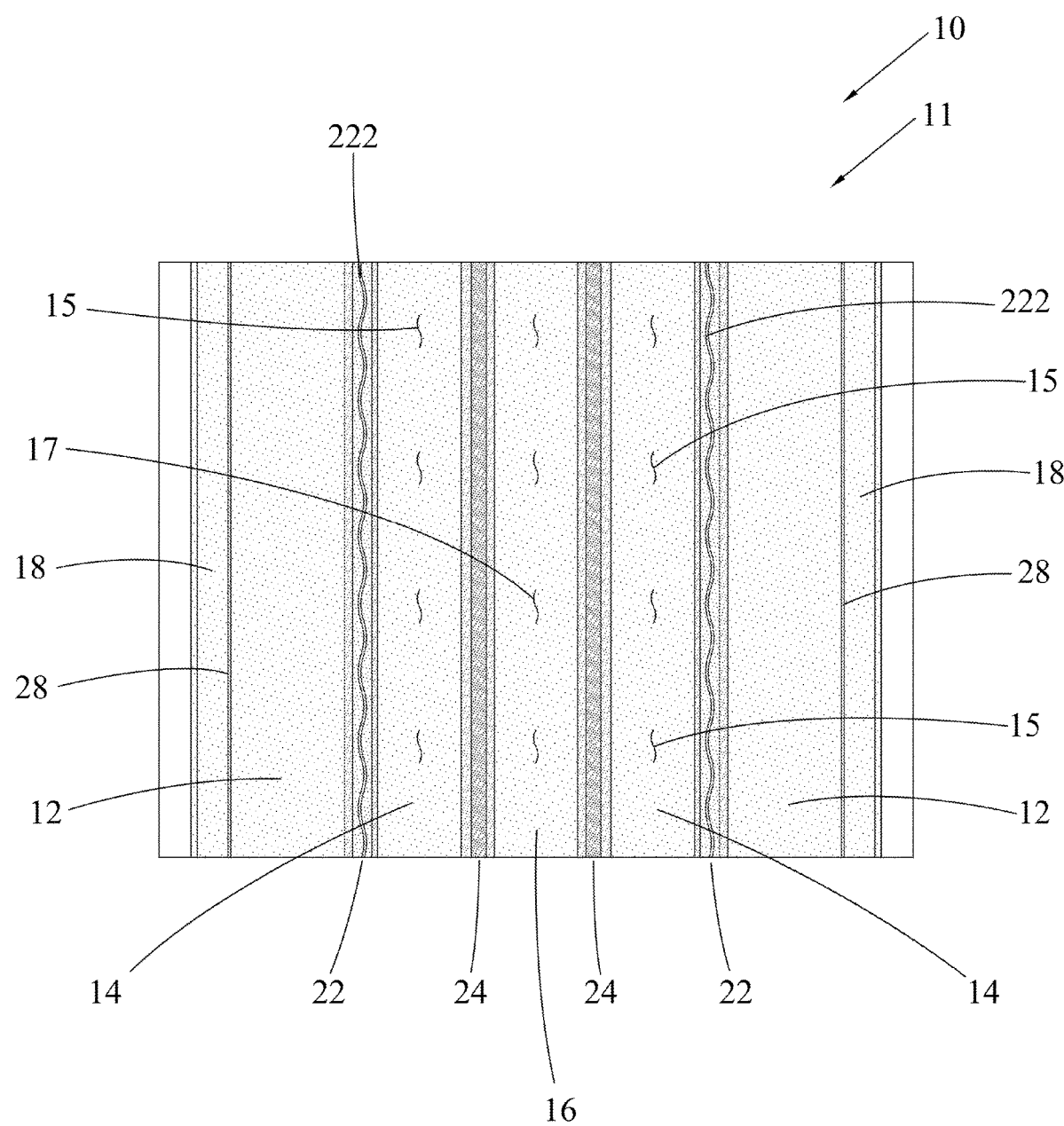
FIG. 3 is a schematic detail view of the tread of FIG. 2.
Figure 4:
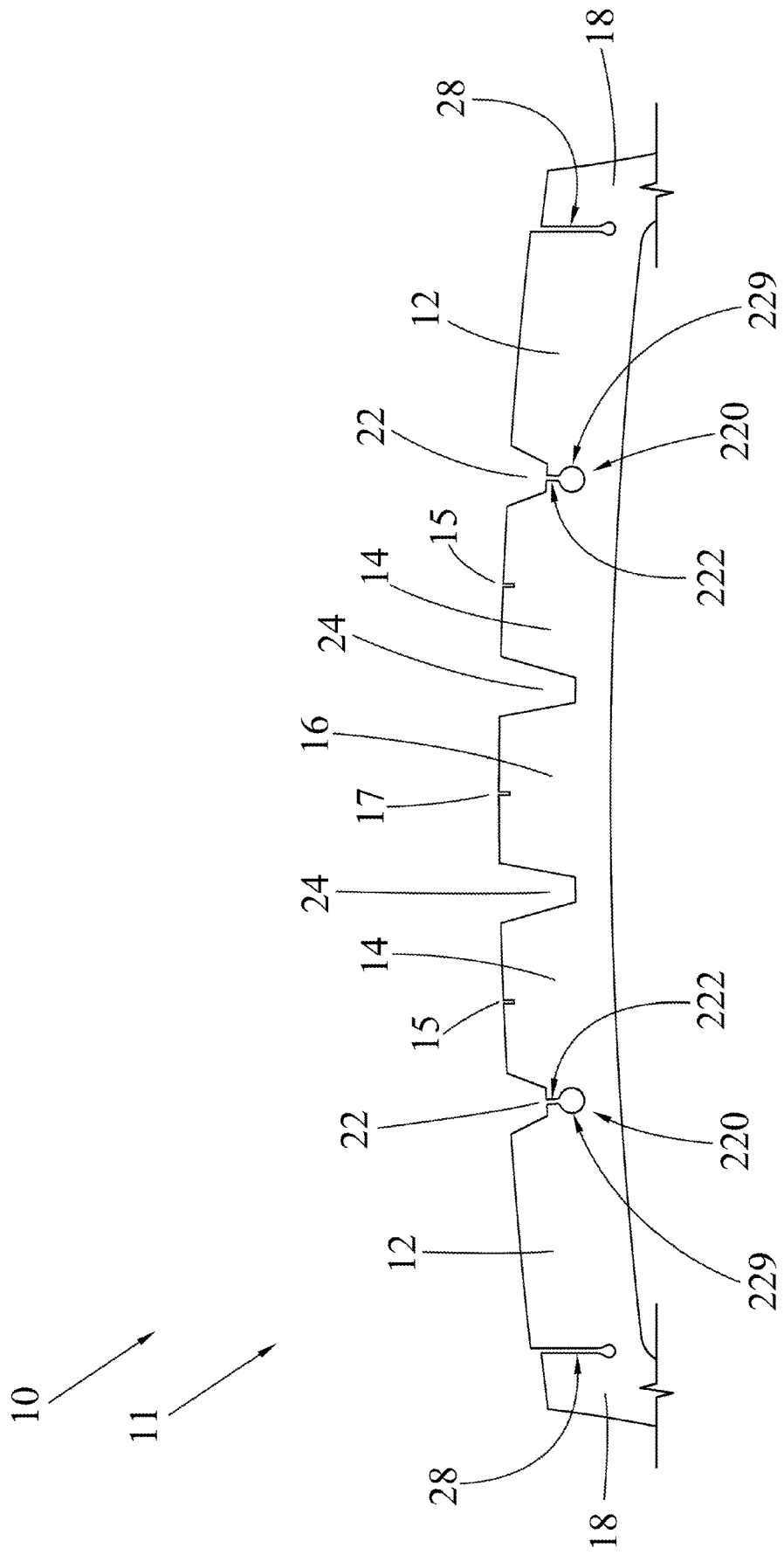
FIG. 4 is a schematic section view taken along the line "4-4" in FIG. 2.
Figure 5:
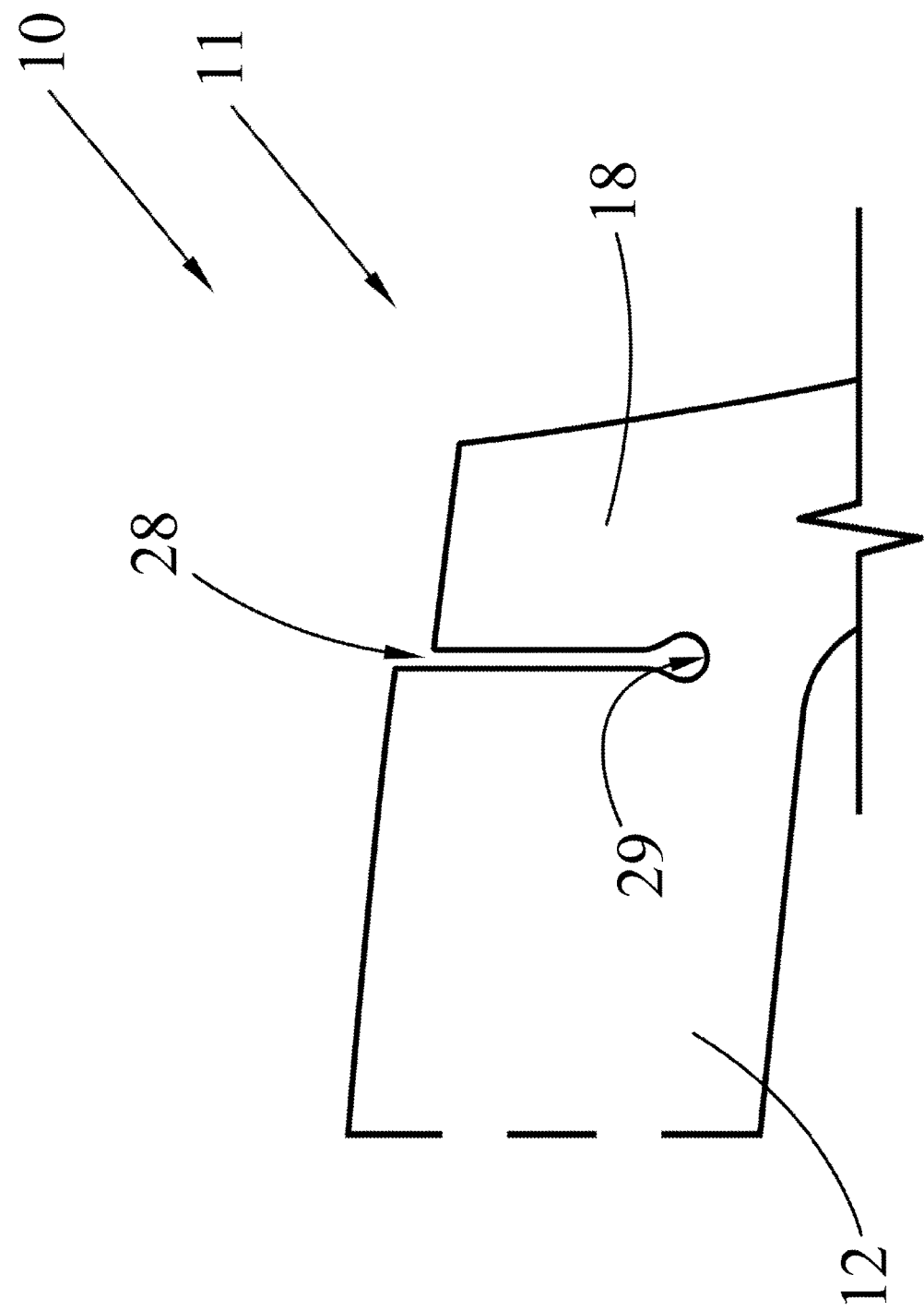
FIG. 5 is a schematic detail drawing of a shoulder area of FIG. 4.

Referring now in more detail to the drawings, the present invention will below be described in more detail. The pneumatic, or non-pneumatic, tire 10 illustrated in FIGS. 1-5 may have a tread 11 with narrow sacrificial circumferential shoulder ribs 18 defined by circumferential shoulder grooves 28 at the lateral edges of the main tread portion. The shoulder grooves 28 may have curved, cylindrical radially innermost surfaces 29 to mitigate cracking (FIG. 5). The narrow sacrificial shoulder ribs 18 may be radially recessed from the main tread portion. The main tread portion may be defined by intermediate circumferential first ribs 12, intermediate circumferential second ribs 14, and a center intermediate circumferential third rib 16. The intermediate circumferential ribs 12, 14, 16 may be defined by the shoulder grooves 18, two stabilizing circumferential grooves 22, and two central circumferential grooves 24. The two central circumferential grooves 24 may each have a trapezoidal cross-section with slanted walls and a flat bottom (FIG. 4). The intermediate circumferential second ribs 14 and the center intermediate circumferential third rib 16 may have wavy blind sipes 15, 17, respectively, for improving performance of the tread 11.

The two stabilizing circumferential grooves 22 may also have a trapezoidal cross-section with slanted walls and a flat bottom, similar to the two central circumferential grooves 24. As shown in FIG. 4, the radial depth of each stabilizing grooves 22 may be more shallow or less than the depth of the central circumferential grooves 24. The stabilizing groove depths may be about 50% of the central groove depths (FIG. 4). At the flat bottom of each stabilizing groove 22 may be a stabilizing structure 220. The stabilizing structures 220 may define circumferentially extending wavy subgrooves 222 in the bottoms of the stabilizing grooves 22. As shown in FIG. 3, both the axial width of the subgrooves 222 and the axial width of the wave pattern may be less than the axial width of the bottoms of the stabilizing grooves 22. The subgrooves 222 may have curved, cylindrical radially innermost surfaces 229 to mitigate cracking and to increase axial flexibility of the stabilizing structures 222 (FIG. 5).

When an axially inward load is placed on the tread 11, such as while the vehicle is cornering, the axial width of the subgrooves 222 may shrink to as little as 0.0 mm (e.g., touching). Because of the wavy pattern of the subgrooves 222, the walls of the subgrooves may interlock thereby preventing relative circumferential movement between the walls of the subgrooves. This may provide an increase in stiffness of the tread 11 while cornering, without requiring increased overall stiffness of the tread during straight line movement of the vehicle.

During normal running of the vehicle, the narrow sacrificial shoulder ribs 18 may remain recessed to maintain a sharp edge at the axially or laterally outer edges of first ribs 12. The narrow sacrificial shoulder ribs 18 may deflect into the first ribs 12 during lateral maneuvers of the vehicle in order to laterally support the first ribs. These narrow sacrificial shoulder ribs 18 may have a coupling effect with the first ribs 12 to maintain a flat lateral or transverse profile of the footprint of the tread 11. The narrow sacrificial shoulder ribs 18 may wear at essentially the same rate as the main tread portion thereby maintaining a stable radial recess or offset distance from the main tread profile (FIG. 5).

While the present invention has been described in connection with what is considered the most practical and preferred example, it is to be understood that the present invention is not to be limited to these described examples, but is intended to cover various arrangements which are included within the spirit and scope of the broadest possible interpretation of the appended claims so as to encompass all modifications and equivalent arrangements which are possible.

What is claimed:

1. A tire comprising:
a main tread portion having a stabilizing circumferential groove located between a first and second rib;
the stabilizing circumferential groove having a cross section with a first and second slanted sidewall joined together with a bottom surface, the stabilizing circumferential groove further including a stabilizing structure for increasing tread stiffness, the stabilizing structure having a sub-groove located radially inward of the bottom surface, wherein the sub-groove extends circumferentially in a wavy pattern,
the sub-groove having a first sidewall and a second sidewall interconnected by a curved surface forming a radially innermost bottom of the subgroove.

2. The tread as set forth in claim 1 wherein an axial width of the sub-groove shrinks to 0.0 mm under the predetermined operating condition.

3. The tire of claim 1 wherein the bottom surface of the stabilizing circumferential groove is flat.

4. The tire of claim 1 wherein the main tread portion further comprises a circumferential groove having a cross section with a pair of opposed slanted walls joined together with a flat bottom.

5. The tire of claim 4 wherein a radial depth of the flat bottom of the circumferential groove is greater than a radial depth of the bottom surface of the stabilizing circumferential groove.

6. The tire of claim 1 wherein there are two stabilizing circumferential grooves.

7. The tire of claim 1 wherein the tread further comprises a circumferential shoulder rib located at a lateral edge of the tread, wherein the circumferential shoulder rib is radially recessed from the main tread portion, wherein the circumferential shoulder rib is located adjacent a shoulder groove, the shoulder groove having a radially inner portion having curved cross-sectional shape.

8. The tire of claim 1 wherein the sidewalls of the stabilizing circumferential groove are slanted away from each other.

9. The tire of claim 1 wherein the wavy pattern of the sub-groove is sinusoidal.

* * * * *